April 19, 1966 R. WESTFALL 3,246,609
MONORAIL ASSEMBLY SYSTEM
Filed July 6, 1964
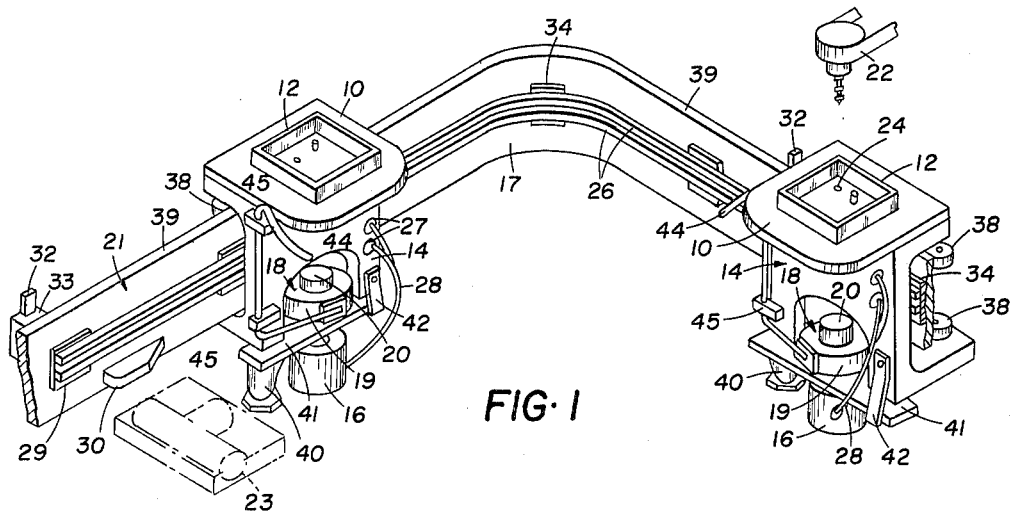
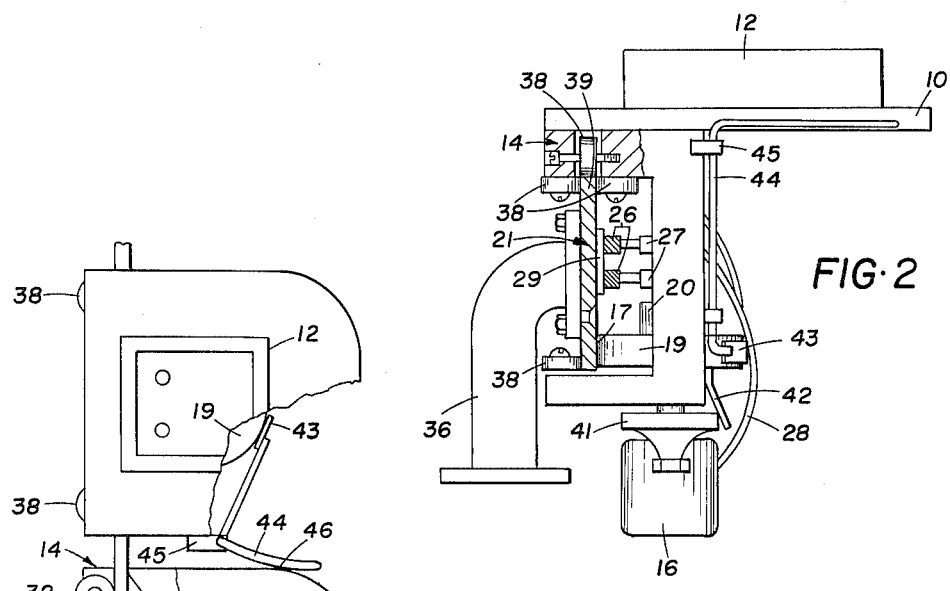
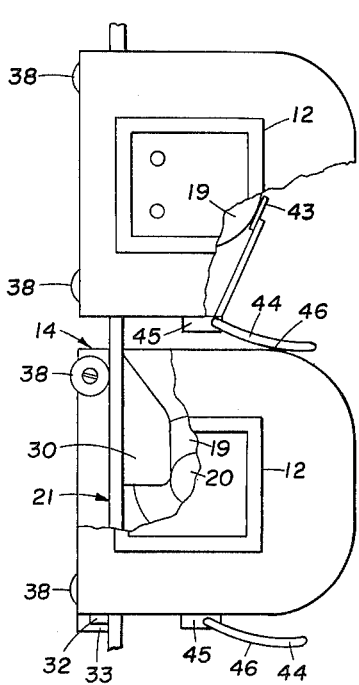
ROBERT WESTFALL
INVENTOR.
BY R. Frank Smith
David P. Ogden
ATTORNEYS

United States Patent Office 3,246,609
Patented Apr. 19, 1966

3,246,609
MONORAIL ASSEMBLY SYSTEM
Robert Westfall, Rochester, N.Y., assignor to Eastman Kodak Company, Rochester, N.Y., a corporation of New Jersey
Filed July 6, 1964, Ser. No. 380,373
5 Claims. (Cl. 105—145)

The present invention relates to a monorail assembly system and, more particularly, to a monorail assembly system suitable for transporting thereon a plurality of self-driven pallet assemblies which may be stopped at various sub-assembly stations along a monorail track.

In the art of automation or more particularly, automated or partially automated assembly lines, it is common practice to convey both parts and assembly units to a sub-assembly station where these parts and units are coupled together to form a more complete assembly unit. Various types of conveyors have been utilized including chain-driven conveyors with or without automatic stops or detaching means which conveyors are often used to assure a continuous supply of necessary parts at a selected sub-assembly station. Belt conveyors are also used as are chutes, etc. However, most conveyor systems of the types used with sub-assembly stations for production lines do not automatically position an assembly unit in a precisely predetermined location relative to automatic tools and equipment which may be utilized to operate upon the assembly unit. Even those that do accomplish precise location often accomplish it in a rather complex manner, usually by means of direct assembly unit manipulation at the sub-assembly station by use of complex jigs and fixtures requiring close supervision and inspection and frequent maintenance.

Therefore, an object of the present invention is to provide a simple and reliable monorail transport system arranged to automatically position sub-assembly components in a predetermined location.

A more specific object of the present invention is to provide a precise and reliable stopping arrangement for a plurality of pallet assemblies at a work station on a monorail track.

In the environment of my invention, an endless monorail track supports a plurality of self-propelled pallet assemblies. The location of the monorail track is known and each terminal location of the pallet assemblies on the track is predetermined by stop mechanisms precisely located relative to sub-assembly work stations. The self-propelling of the pallet assemblies is accomplished by an electric motor carried on each pallet assembly, with this motor being of the type which may be continuously energized irrespective of whether or not it moves the pallet assembly. By this means a continuous torque is applied from the motor to the monorail track to drive the pallet assembly in a forward direction. A drive wheel of the motor is provided with two different surface diameters to provide rapid transport between stations and a much slower transport near each terminal location. One such monorail assembly system is shown in the copending patent application, Serial No. 324,293, filed November 18, 1963, by Clarence W. McVea and myself and is assigned to the assignee of the present invention which is an improvement thereover.

An embodiment of my invention utilizes a cumulative braking system whereby several pallet assemblies may be accumulated at one work station without shock loading of the pallet assembly being worked on. This is accomplished by a torsion bar type engagement between a series of pallet assemblies whereby a brake shoe is applied to the drive wheel of each of the trailing pallet assemblies as the torsion member engages the stopped ones. Thus a resilient, rather than shock, contact is made and increases of pressure result in increases of braking force.

The subject matter which is regarded as my invention is particularly pointed out and distinctly claimed in the concluding portion of this specification. The invention, however, as to its organization and operation, together with further objects and advantages thereof, will best be understood by reference to the following description taken in connection with the accompanying drawing in which:

FIG. 1 is a perspective view of a section of a monorail transport arrangement in accordance with my invention;

FIG. 2 is an elevational view partially in section of a pallet assembly on the monorail track; and FIG. 3 is a plan view of two pallet assemblies partially in section illustrating the cumulative braking arrangement.

Referring now to the drawing, wherein like numbers refer to similar parts, I have shown in FIG. 1 a monorail transport system supporting a pair of pallet assemblies each provided with a pallet platform 10 supporting an assembly unit or component 12 to be worked on. The pallet platform 10 is supported upon a frame member 14 which pivotally supports a driving motor 16. The motor 16 is provided with a drive wheel 18 having a large diameter drive surface 19 and a small diameter drive surface 20. As illustrated in FIG. 1 the large diameter drive surface 19 is engaging a drive surface 17 of an endless monorail track 21 which is threaded through a tortuous path past a plurality of sub-assembly stations, one sub-assembly station being indicated at 22 and a next sub-assembly station 23 (shown in phantom).

By way of example, the sub-assembly station 22 may be utilized to provide the assembly component 12 with a tapped hole 24 for receiving a threaded member (not illustrated) to be positioned, inserted, and secured therein at the station 23. The details of the arrangement of the sub-assembly station 23 are explained more fully in my copending patent applications, Serial Nos. 324,295 and 324,319, filed November 11, 1963, and assigned to the assignee of the present case.

Referring again to FIG. 1, power for the motor 16 is provided continuously through bus bars 26, commutator brush assemblies 27, and a power line 28. I prefer that the bus bars 26 etc., be constantly energized with a relatively low voltage such as 24 volts enhancing minimum use of insulation and minimum danger of personnel injury.

In order that the assembly line may be easily enlarged or otherwise modified, we prefer to have the monorail track 21 fabricated of two foot sections of ⅜" x 6" steel mounted vertically. The bus bars 26 are preferably secured to each section by insulating pads 29 and joined to form endless bus bars by plug-in friction couplings.

As the pallet platforms 10 reach the sub-assembly stations (e.g.: 23) the smaller drive surface 20 of the drive wheel 18 is engaged by an elevated track portion or ramp 30. With the smaller drive surface 20 being solely effective to drive the pallet assembly, the pallet assembly is slowed to approximately one-third of its normal drive speed at the time a rugged slidable stop latch 32 driven by a solenoid 33 engages a surface of the frame 14 to completely stop the pallet assembly. As explained above, the continuous drive system maintains the pallet assembly tight against the stop latch 32.

The carbon brushes of the brush assemblies 27 are more clearly illustrated in FIG. 2 as is the support 29 for the bus bars 26. As is also shown more clearly in FIG. 2, the monorail track 21 is supportable by means illustrated as a heavy-duty strut 36. Usually the struts 36 will be supported above the floor so that the pallet platform 10 and the sub-assembly stations are at a convenient working level such as thirty to forty inches above the floor.

Transport of each pallet assembly along the monorail track 21 is facilitated by a plurality of ball bearing races used as rollers 38 journalled on the frame 14. A portion of these rollers engage a top support surface 39 of the track. The use of precision ball bearings has the advantage that it is no longer necessary to lift the assembly component 12 from the pallet platform 10 to attain a precisely controlled location of the assembly component. Such a simplified arrangement for attaining a precise location of the assembly component 12 on the monorail track saves substantial cycle time at each sub-assembly station over many prior art arrangements.

In order that the driving motor 16 may drive the pallet platform 10 by means of either portion of the drive wheel 18, the motor is resiliently mounted and pivotally supported on the pallet frame 14 by an arm 41 having a pivot bearing 40 (FIG. 1) and biased toward the drive surface 17 by a spring means shown as a leaf spring 42. The precision locating portions of the pallet assembly include the monorail track 21 and the ball bearing rollers 38. Thus, the influence of the ramp 30 does not cause misalignment of the pallet assembly.

As shown more clearly in FIG. 3, the ramp 30 is of sufficient thickness, such as 1 1/16 inches, to engage the smaller drive surface 20 and lift the larger drive surface 19 from the driving surface 17 of the monorail track 21 when the diameters of these drive surfaces are 3 inches and 1 inch respectively. Obviously, with only the smaller diameter surface engaging a solid driving surface of the ramp 30, the pallet assembly will advance at a much slower speed. Also, the driving force is substantial, whereby bounce-back is eliminated.

In accordance with the present invention the cumulative braking system is illustrated in the form of a brake shoe 43 operable by a torsion bar drive means 44. These parts are also illustrated in FIG. 3, where a second pallet assembly has reached one of the sub-assembly stations (e.g.: 23) while a leading pallet assembly is still there. The second pallet assembly has been stopped by the brake shoe 43 having its work surface driven against the drive surface 19 of the drive wheel. The torsion bar lever 44 engages a stopped surface of the lead pallet assembly to thereby apply braking force to the brake shoe 43. I prefer to have the torsion bar lever 44 of a spring steel such as heavy gauge piano wire so that the engagement between a stopped pallet and the approaching one is resilient. The spring lever 44 is mounted in bearing 45, so that its work surface 46 is substantially in front of the leading edge of its pallet assembly. Thus the only contact between pallet assemblies is the torsion lever 44 to provide braking action of the approaching pallet. This braking action is more than enough to overcome the driving force of the trailing pallet assembly motor.

While I have shown and described particular embodiments of the present invention, other modifications may occur to those skilled in this art. I intend, therefore, to have the appended claims cover all embodiments which fall within the true spirit and scope of my invention.

I claim:
1. A monorail assembly system suitable for transporting a plurality of self-driven pallet assemblies, comprising:
   an endless monorail track providing with a drive surface thereon;
   a plurality of pallet assemblies movably supported on said monorail track;
   a driving motor resiliently supported on each of said pallet assemblies;
   a drive wheel having a large diameter drive surface arranged to engage the drive surface of said monorail track and a smaller diameter drive surface, with said drive wheel being energized by said driving motor;
   a ramp secured to said monorail track and having a surface at a location which will engage the small diameter drive surface during passage of said drive wheel thereby and of a thickness sufficient to disengage the large diameter drive surface from the monorail track drive surface;
   means for stopping a pallet assembly at a work station;
   a spring torsion bar lever on each of said plurality having a work surface positioned to engage a leading pallet assembly;
   and a brake shoe operable by said lever to engage said drive wheel for overcoming the driving force when a trailing pallet assembly torsion bar lever engages a stopped one.

2. a monorail assembly system as in claim 1 wherein a work surface of said torsion bar lever engages a stopped pallet assembly prior to any other contact therebetween so that a braking force is applied to the approaching pallet assembly as a result of the flexing of said lever.

3. A monorail assembly system suitable for transporting a plurality of self-driven pallets, on an endless monorail track provided with a support surface and a separate drive surface thereon, comprising:
   a drive wheel on each of the pallets, having a drive surface arranged to engage the drive surface of the track;
   means secured to the monorail track for stopping a first of the pallets;
   a brake shoe on each of the pallets for stopping them; and
   a torsion lever on each pallet having a work surface arranged to engage a leading stopped pallet to drive said brake shoe against said drive wheel and thereby stop a next pallet.

4. A monorail assembly system in accordance with claim 3 wherein said torsion lever includes a relatively long straight section between the work surface and said brake shoe which is twisted during braking by the force transmitted therethrough.

5. A monorail assembly system suitable for transporting a plurality of self-driven pallet assemblies on an endless monorail track and each having a driving motor thereon, comprising:
   a drive wheel energized by the driving motor;
   means for stopping a pallet assembly at a work station;
   a spring torsion bar lever on each of the pallet assemblies and having a work surface positioned to engage a stopped leading pallet assembly;
   and a brake shoe operable by said lever to engage said drive wheel for overcoming the driving force when a trailing pallet assembly torsion bar lever engages the stopped one so that the contact therebetween is resilient to reduce jarring of the stopped one and eliminate faulty work thereon conditional on such jarring.

References Cited by the Examiner

UNITED STATES PATENTS 2,619,916 12/1952 Rainier _____ 104—172
3,056,359 10/1962 Fey _____ 104—95

ARTHUR L. LA POINT, *Primary Examiner.*

F. W. MONAGHAN, *Assistant Examiner.*